(12) United States Patent
Song et al.

(10) Patent No.: US 10,104,629 B2
(45) Date of Patent: Oct. 16, 2018

(54) NARROWBAND SYNCHRONIZATION AND PAGING IN LONG-TERM EVOLUTION NETWORKS

(71) Applicant: Verizon Patent and Licensing Inc., Arlington, VA (US)

(72) Inventors: Lei Song, Fremont, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 14/956,914

(22) Filed: Dec. 2, 2015

(65) Prior Publication Data

US 2017/0164364 A1 Jun. 8, 2017

(51) Int. Cl.
*H04W 56/00* (2009.01)
*H04W 4/70* (2018.01)
*H04W 68/00* (2009.01)

(52) U.S. Cl.
CPC .......... *H04W 56/003* (2013.01); *H04W 4/70* (2018.02); *H04W 68/005* (2013.01)

(58) Field of Classification Search
CPC ... H04L 5/0037; H04L 5/0044; H04L 5/0048; H04L 5/0064; H04L 27/265; H04W 4/70; H04W 56/003; H04W 68/006
See application file for complete search history.

(56) References Cited

U.S. PATENT DOCUMENTS

| | | | | |
|---|---|---|---|---|
| 2006/0093051 A1* | 5/2006 | Hou | ...... | H04L 25/061 375/260 |
| 2012/0163223 A1* | 6/2012 | Lo | ...... | H04L 5/0007 370/252 |
| 2014/0029568 A1* | 1/2014 | Wang | ...... | H04W 72/04 370/330 |

(Continued)

OTHER PUBLICATIONS

3GPP TR 45.820 V2.1.0 (Aug. 2015), "Technical Specification Group GSM/EDGE Radio Access Network; Cellular System Support for Ultra Low Complexity and Low Throughput Internet of Things (Release 13)" 3rd Generation Partnership Project, Aug. 2015.

*Primary Examiner* — Michael Thier
*Assistant Examiner* — Prince A Mensah

(57) ABSTRACT

Techniques described herein may be used to more efficiently use subcarriers allocated to a narrowband channel of a wireless telecommunications network. For example, a base station may identify a middle subcarrier of the narrowband channel and partition the middle subcarrier into additional subcarriers. The additional subcarriers may include a direct circuit (DC) subcarrier occupying a middle bandwidth of the middle subcarrier, and a synchronization subcarrier and a paging subcarrier on either side of the DC subcarrier. The synchronization subcarrier may be dedicated exclusively to communicating synchronization information, and the paging subcarrier may be dedicated exclusively to communicating paging information. The synchronization information may include a preamble signal, a Primary Synchronization Signal (Continued)

(PSS), and a Secondary Synchronization Signal (SSS) that are repeated over consecutive frames. The paging information may include paging codes that devices may passively listen for in order to be paged by the base station.

20 Claims, 12 Drawing Sheets

(56) References Cited

U.S. PATENT DOCUMENTS

| | | |
|---|---|---|
| 2016/0014718 A1* | 1/2016 | Mysore Balasubramanya ............ H04W 68/02 455/458 |
| 2016/0105803 A1* | 4/2016 | Sakhnini ............... H04L 27/265 455/45 |

* cited by examiner

NARROWBAND SYNCHRONIZATION AND PAGING IN LONG-TERM EVOLUTION NETWORKS

BACKGROUND

Current wireless telecommunication networks often emphasize broadband wireless services that provide user devices (e.g., smartphones, tablet computers, etc.) with high data rate connections. Providing high data rate connections is particularly beneficial to user devices since user devices are often engaged in sending and receiving data-intensive content such as images, music, videos, etc. A developing aspect of wireless telecommunication networks includes narrowband services that often include network connections with lower data rates but that require less power consumption to transmit over long distances.

As such, narrowband services may be particular beneficial to devices that tend to transmit small amounts of information and/or that have a limited power supply, which often include Machine-to-Machine (M2M) devices and Machine-Type-Communication (MTC) devices. Examples of such devices may include sensors that measure the speed, gas consumption, temperature, etc., of a vehicle and that transmit the measurements to a centralized server for analysis. Another example of such devices may include a utility meter (e.g., an electricity meter, a gas meter, etc.) that collects utility usage information and wirelessly transmit the information to a centralized server for charging purposes. While narrowband services may be particularly beneficial to M2M devices and MTC devices, narrowband services may also be used by user devices on occasion, such as when a user device needs to transmit small amounts of information over long distances.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1A:
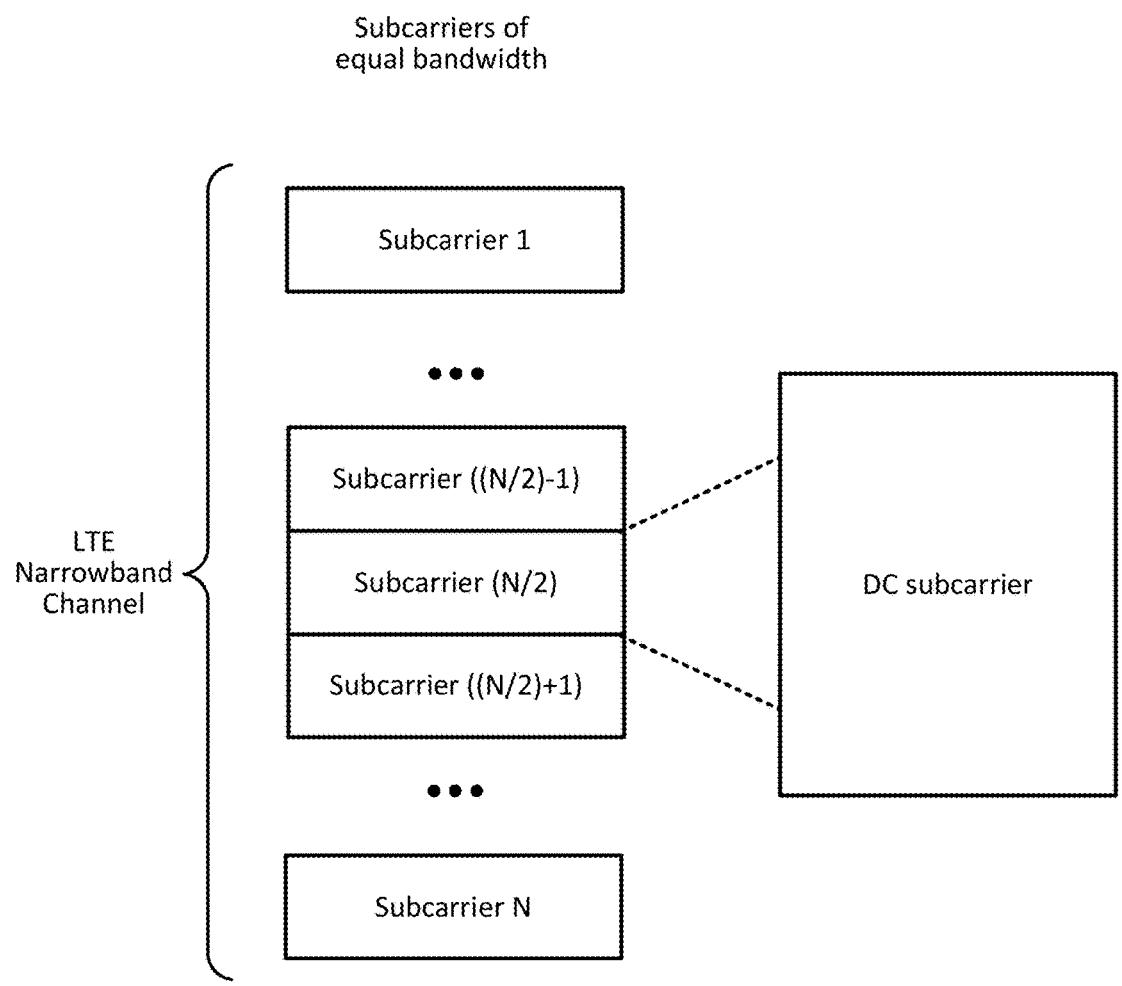
FIGS. 1A and 1B illustrate an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As discussed above, an area of development regarding wireless telecommunication networks includes offering narrowband connections to M2M devices, MTC devices, and other devices that tend to transmit small amounts of information to a wireless telecommunications network and/or that may operate on a limited power supply, such as a battery. For brevity, such devices shall be collectively referred to herein as "M2M devices." However, it should be clear that the techniques described herein may be readily applicable to other types of wireless devices that may have different data transmission needs and behaviors. For instance, the techniques described herein may be applicable to user devices, such as smartphones, tablet computers, etc.

Current proposals for offering narrowband connections in a Long-Term Evolution (LTE) network include creating a narrowband channel. The narrowband channel may include a 180 Kilohertz (KHz) frequency band that is divided into 12 subcarriers of 15 KHz each. The twelve subcarriers may be numbered from 6 to −5 with the subcarrier in the middle being subcarrier 0. Subcarriers from −5 to −1 and from 1 to 6 may be used for transmitted information between an M2M device and a base station, while the middle subcarrier (subcarrier 0) may include a direct circuit (DC) subcarrier that is not used to transmit information.

While the DC subcarrier may not be used to transmit information, the DC subcarrier may provide the benefit of reducing the impact of DC offset leaks that might otherwise interfere with using the other subcarriers to transmit information. Such interferences may be particularly troublesome for devices (e.g., an M2M device) with zero intermediate frequency (IF) oscillators (e.g., an oscillator with frequency that is supposed to match the frequency of an incoming signal). However, while having a DC subcarrier may provide a solution for reducing the negative effects of DC offset leaks, allocating an entire 15 KHz subcarrier in a channel that only includes 180 KHz is, effectively, a forfeiture of 8% of the total transmission capacity of the channel. As such, current proposals for a narrowband LTE channel include an inefficient allocation of channel capacity to the DC subcarrier.

Additionally, current solutions for providing synchronization information to M2M devices in an LTE network include M2M devices having to listen for synchronization that is spread throughout a channel intended for user devices and other high data rate devices. For instance, a Primary Synchronization Signal (PSS) and a Secondary Synchronization Signal (SSS) may each be transmitted in every 20 milliseconds (MS) within an 80 ms frame. The PSS and SSS may be staggered with respect to one another, such that either the PSS or SSS is provided every 10 ms. Doing so may be adequate for a high data rate device, such as a user device, but it may amount to an overly complicated synchronization process from an M2M device that may give rise to certain problems. For instance, staggering the PSS and the SSS may enhance offset problems associated with oscillator inaccuracies and having such long periods of time between each PSS or SSS may increase the time (and, therefore, the battery power) required to synchronize the M2M device.

Furthermore, current solutions for paging M2M devices in an LTE network include paging the M2M devices in a similar way as non-narrowband devices (e.g., user devices). For instance, the M2M device must periodically exit a sleep or idle mode used to conserve battery power and then listen for paging signals that a base station may, or may not, be transmitting. Doing so may be a drain on the already limited power supply of M2M devices, which may in turn decrease the amount of time that the M2M device may continue operating without replacing or recharging the power supply of the M2M device. As such, current narrowband proposals for LTE networks may include an inefficient usage of the frequency band allocated for narrowband communications, include lengthy and problematic synchronization processes, and include inefficient paging solutions.

Techniques described herein may be used to enable enhanced narrowband communications in an LTE network by partitioning a middle subcarrier, of a narrowband channel, into additional subcarriers that may include a synchronization subcarrier, a DC subcarrier, and a paging subcarrier. For instance, a narrowband channel may include 12 subcarriers of 15 KHz each. Subcarriers −5 to −1 and 1-6 may be dedicated to transmitting data, while the middle subcarrier (subcarrier 0) may be a DC subcarrier. Since 15 KHz may not be necessary for a DC subcarrier to be effective in a 180 KHz channel (12 subcarriers at 15 KHz each equals 180 KHz), subcarrier 0 may be divided or partitioned to include a 3.75 KHz synchronization subcarrier, a 3.75 KHz DC subcarrier, and a 3.75 paging subcarrier. Since these three additional subcarriers only total 11.25 KHz, subcarrier 0 may also be divided into 1.875 KHz guard bands at the upper and lower ranges of subcarrier 0. Providing dedicated synchronization and paging subcarriers in the narrowband channel may enable M2M devices to be synchronized and paged with greater efficiency (e.g., by saving time and power) while still leaving enough bandwidth for a DC subcarrier that is effective at preventing DC offset interferences within the narrowband channel. The guard band subcarriers may ensure that the synchronization and paging subcarriers do not interfere with, and are not interfered by, the other subcarriers in the narrowband channel.

Figure 1B:
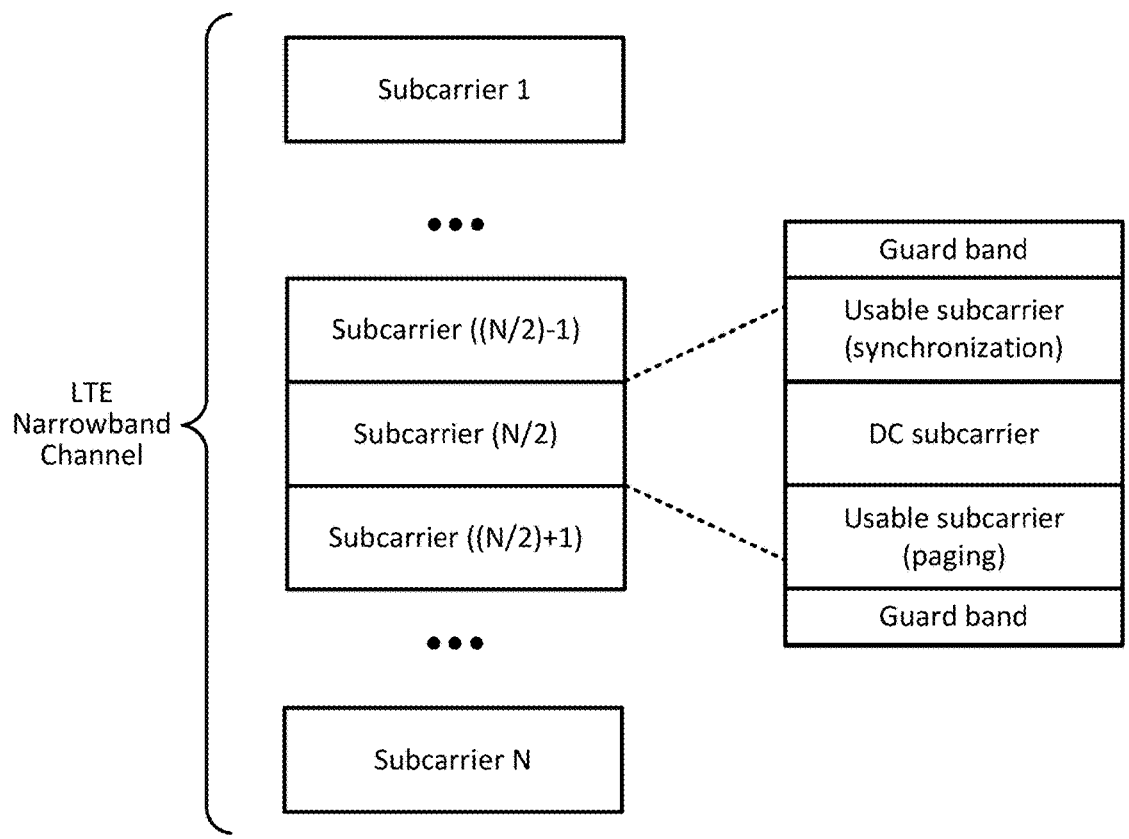

FIGS. 1A and 1B illustrate an example overview of an implementation described herein. FIG. 1A may correspond to a LTE narrowband channel that is currently known. The LTE narrowband channel may be divided into multiple subcarriers of equal bandwidth. For instance, the LTE narrowband channel may be a 180 KHz channel divided into 12 subcarriers of 15 KHz each. Most of the subcarriers (e.g., subcarriers 1 to ((N/2)−1) and ((N/2)+1) to N) may be used for transmitting data between an M2M device and an enhanced Node B (eNB), while the middle subcarrier (subcarrier (N/2)) may be a DC subcarrier for preventing DC offset leaks from interfering with the other subcarriers. None of the subcarriers are used to provide synchronization and/or paging information.

As such, while the LTE narrowband channel may provide for data transmission and DC offset leak prevention, allocating so much bandwidth (e.g., 15 KHz, or 8% of the overall channel bandwidth) to the DC subcarrier may be an inefficient use of the channel's bandwidth, since DC offset leaks in a 180 KHz channel may be prevented from interfering with the other subcarriers with much less than 15 KHz of bandwidth. Additionally, since the LTE narrowband channel fails to provide subcarriers for synchronization and paging, M2M devices may be required to be synchronized and paged through existing LTE techniques, which (as described above) may be inefficient for M2M devices, since the existing LTE techniques may be more intended for user devices or other types of high data rate devices.

As shown in FIG. 1B, techniques described herein may be used to provide a superior LTE narrowband channel by redesigning the middle subcarrier. For instance, the middle subcarrier may be redesigned to reduce the bandwidth associated with the DC subcarrier and create two new subcarriers on either side of the DC subcarrier. The new DC subcarrier may still include enough bandwidth to adequately prevent DC offset leaks from interfering with other subcarriers of the narrowband channel. In addition, one of the new subcarriers may be dedicated to synchronization information, and the other new subcarrier may be dedicated to paging information. As such, the LTE narrowband channel of FIG. 1B may include a superior LTE narrowband channel by providing synchronization and paging channels, in addition to maintaining an effective DC subcarrier.

Guard bands may also be created at the upper bandwidth and lower bandwidth portions of the subcarrier to help ensure that the new subcarriers (e.g., the synchronization subcarrier and the paging subcarrier) do not interfere with the other subcarriers of the channel. In addition, as described herein, the synchronization subcarrier may present synchronization information to M2M devices in a more direct and concise manner (in order to reduce the time and power required to synchronize M2M devices). Similarly, as is also described herein, the paging subcarrier may present paging information to M2M devices in a more direct and concise manner in order to reduce the time and power required to page M2M devices.

As described herein, the actual subcarrier that is designated as the middle subcarrier for a particular narrowband channel may depend on the total number of subcarrier in the narrowband channel. For instance, subcarrier 5 may be the middle subcarrier in a narrowband channel with 9 subcarriers because since 5 is the numerical middle of 1-9. By contrast, the subcarrier designated as the middle subcarrier in a narrowband channel with an even number of subcarriers may include either subcarrier nearest to the middle of the narrowband channel. For instance, in a narrowband channel of 8 subcarriers, subcarrier 4 or subcarrier 5 may be designated as the middle subcarrier for the narrowband channel.

Figure 2:
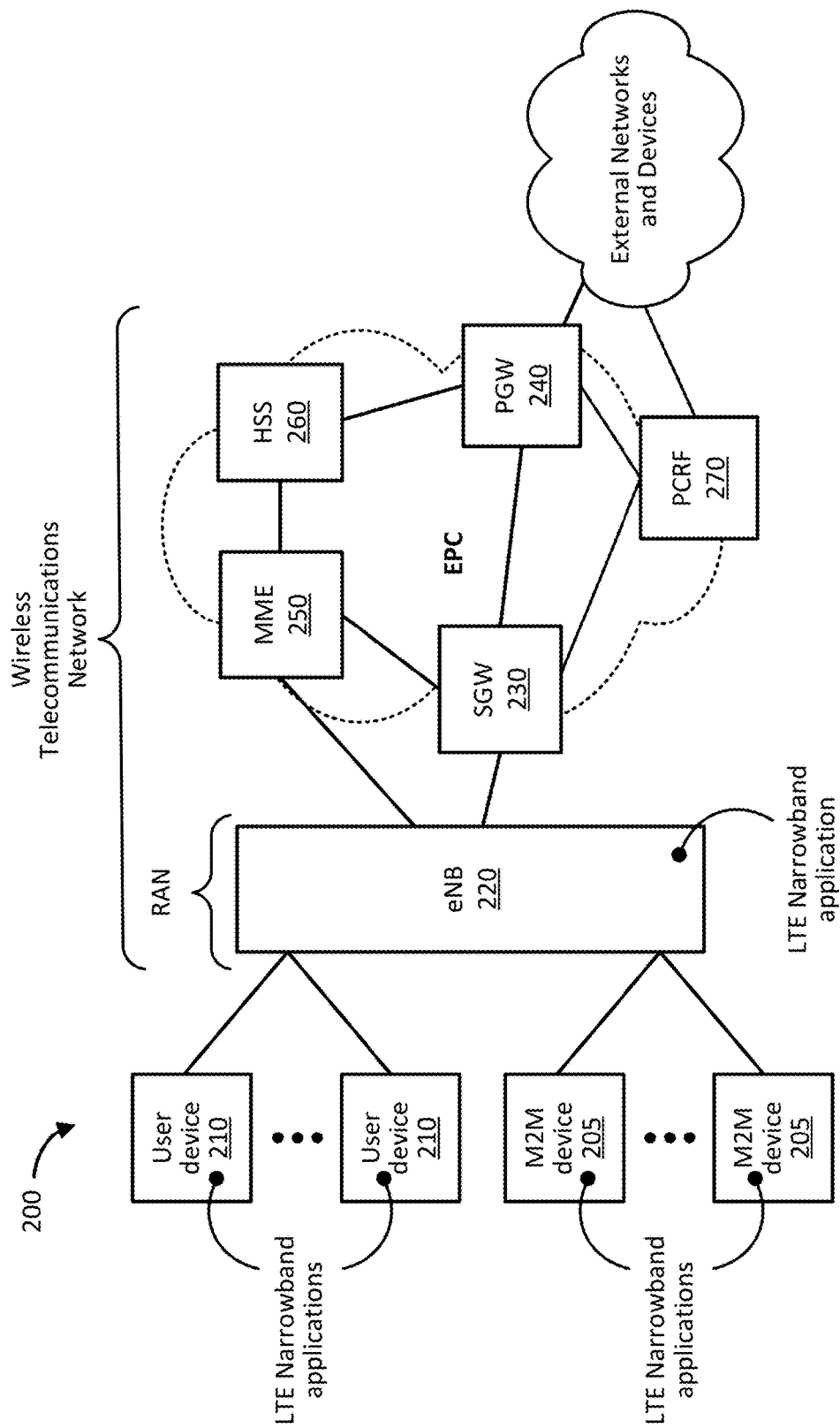
FIG. 2 is a diagram of an example environment in which systems and/or methods described herein may be implemented.

FIG. 2 is a diagram of an example environment 200 in which systems and/or methods described herein may be implemented. Environment 200 may include M2M devices 205, user devices 210, a wireless telecommunications network, and external networks. The wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, radio access network (RANs) that include one or more base stations, some or all of which may take the form of eNBs 220, via which user devices 210 may communicate with the EPC network.

The EPC network may include Serving Gateway (SGW) 230, Packet Data Network (PDN) Gateway (PGW) 240, Mobility Management Entity (MME) 250, Home Subscriber Server (HSS) 260, and/or Policy and Charging Rules Function (PCRF) 270. As shown, the EPC network may enable user devices 210 to communicate with an external network, such as a Public Land Mobile Networks (PLMN), a Public Switched Telephone Network (PSTN), and/or an Internet Protocol (IP) network (e.g., the Internet).

M2M device 205 may include a computing and communication device that is capable of sending and/or receiving M2M messages, MTC messages, etc., to and/or from eNB 220. In some implementations, M2M device 205 may include a wireless device that periodically uplinks small amounts of information to eNB 220. M2M device 205 may also include a battery-powered device or another type of limited power supply. An example of M2M device 205 may include a sensor inside of a vehicle that measures vehicle speeds, engine revolutions per minute (RPMs), temperature, etc., and uploads the measurements to a centralized server via the wireless telecommunications network.

Another example of M2M device 205 may include a utility meter (or a device connected to a utility meter) that collects utility usage information (e.g., electricity usage, gas usage, etc.) and that uploads the usage information to a centralized server via the wireless telecommunications network. Another example of M2M device 205 may include a warehouse appliance capable of moving about the warehouse and collecting inventory information of products stored in the warehouse, and also of communicating the inventory information to a server via the wireless telecommunications network. Another example of M2M device 205 may include a kitchen appliance (such as a microwave, an oven, a refrigerator, etc.) capable of gathering usage information corresponding to the appliance and communicating the information to a server via the wireless telecommunications network.

M2M device 205 may be capable of communicating with eNB 220 in accordance with the narrowband communication techniques described herein. For example, M2M device 205 may communicate with eNB 220 using an LTE narrowband channel with a middle subcarrier that includes a synchronization subcarrier, a DC subcarrier, and/or a paging subcarrier. The middle subcarrier may also include guard bands corresponding to an upper bandwidth and a lower bandwidth of the subcarrier. In some implementations, M2M device 205 may include software, such as an LTE narrowband application, that enables M2M device 205 to engage in narrowband communications as described herein.

User device 210 may include a portable computing and communication device, such as a personal digital assistant (PDA), a smart phone, a cellular phone, a laptop computer with connectivity to the wireless telecommunications network, a tablet computer, etc. User device 210 may also include a non-portable computing device, such as a desktop computer, a consumer or business appliance, or another device that has the ability to connect to a RAN of the wireless telecommunications network. User device 210 may also include a computing and communication device that may be worn by a user (also referred to as wearable devices) as a watch, a fitness band, a necklace, glasses, an eyeglass, a ring, a belt, a headset, or another type of wearable device. While narrowband communications may be described herein as pertaining to eNB 220 and M2M device 210, user device 210 may also, or alternatively, engage in narrowband communications as described herein. In some implementations, user device 210 may include software, such as an LTE narrowband application, that enables user device 210 to engage in narrowband communications as described herein.

eNB 220 may include one or more network devices that receives, processes, and/or transmits traffic destined for and/or received from M2M device 205 and/or user device 210 (e.g., via an air interface). In some implementations, eNB 220 may send and/or receive information to M2M device 205 and/or user device 210 using one or more of the narrowband communication techniques described herein, which may be enabled by software, such as an LTE narrowband application, installed on eNB 220. For instance, eNB 220 may communicate synchronization and/or paging information using a narrowband channel with a middle subcarrier that includes a synchronization subcarrier, a DC subcarrier, and/or a paging subcarrier. The middle subcarrier may also include guard bands corresponding to an upper bandwidth and a lower bandwidth of the subcarrier. As described in greater detail below, eNB 220 may provide synchronization and/or paging information to M2M device 205 in a direct and concise manner that reduces the time and power required to synchronize and page M2M device 205 using existing LTE synchronization and paging techniques.

SGW 230 may aggregate traffic received from one or more eNBs 220 and may send the aggregated traffic to an external network or device via PGW 240. Additionally, SGW 230 may aggregate traffic received from one or more PGWs 240 and may send the aggregated traffic to one or more eNBs 220. SGW 230 may operate as an anchor for the user plane during a handover procedure and as an anchor for mobility between different telecommunication networks. PGW 240 may include one or more network devices that may aggregate traffic received from one or more SGWs 230, and may send the aggregated traffic to an external network. PGW 240 may also, or alternatively, receive traffic from the external network and may send the traffic toward M2M device 205 and/or user device 210 (via SGW 230 and/or eNB 220).

MME 250 may include one or more computation and communication devices that act as a control node for eNB 220 and/or other devices that provide the air interface for the wireless telecommunications network. For example, MME 250 may perform operations to register M2M device 205 and/or user device 210 with the wireless telecommunications network, to establish bearer channels (e.g., traffic flows) associated with a session with M2M device 205 and/or user device 210, to hand off M2M device 205 and/or user device 210 to a different eNB, MME, or another network, and/or to perform other operations.

HSS 260 may include one or more devices that may manage, update, and/or store, in a memory associated with HSS 260, profile information associated with a subscriber (e.g., a subscriber associated with M2M device 205 and/or user device 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with M2M device 205 and/or user device 210. Additionally, or alternatively, HSS 260 may perform authentication, authorization, and/or accounting operations associated with the subscriber and/or a communication session with M2M device 205 and/or user device 210.

PCRF 270 may receive information regarding policies and/or subscriptions from one or more sources, such as subscriber databases and/or from one or more users. PCRF 270 may provide these policies to PGW 240 or another device so that the policies can be enforced. As depicted, in some implementations, PCRF 270 may communicate with PGW 240 to ensure that charging policies are properly applied to locally routed sessions within the telecommunications network. For instance, after a locally routed session is terminated, PGW 240 may collect charging information regarding the session and provide the charging information to PCRF 270 for enforcement.

Figure 3:
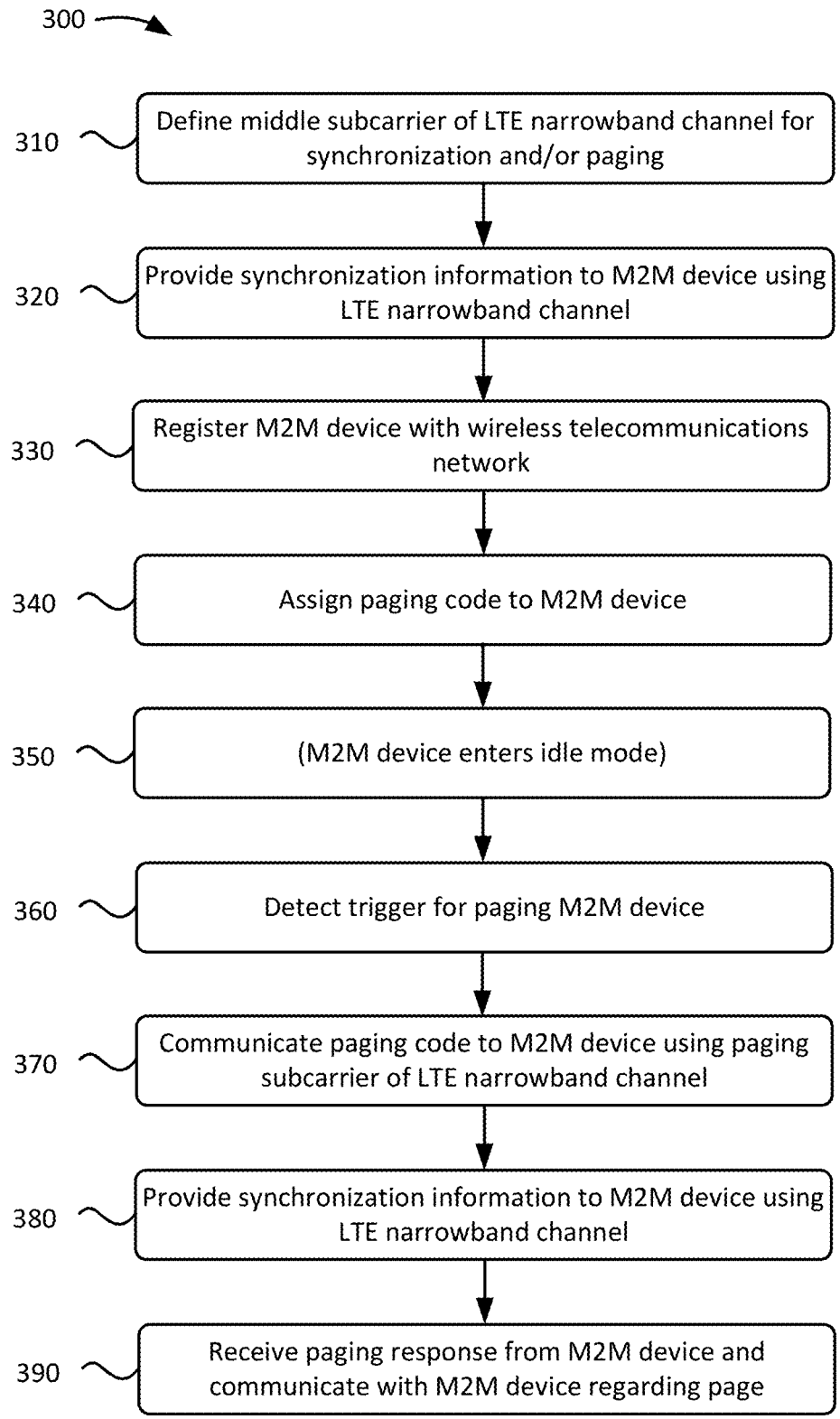
FIG. 3 is a flowchart diagram of an example process for synchronizing and paging a Machine-to-Machine (M2M) device using a Long-Term Evolution (LTE) narrowband channel.

FIG. 3 is a flowchart diagram of an example process 300 for synchronizing and paging an M2M device 205 using an LTE narrowband channel. In some implementations, process 300 may be implemented by eNB 220. In some implementations, process 300 may be performed by eNB 220 and/or one or more other devices, such as the devices discussed above with reference to FIG. 2. The operations of process 300 are described below with periodic reference to FIGS. 4-9.

As shown, process 300 may include defining a middle subcarrier of an LTE narrowband channel for synchronization and/or paging. For instance, eNB 220 may allocate certain radio frequencies, within an LTE narrowband channel, for communicating synchronization and/or paging information. The LTE narrowband channel may correspond to a range of consecutive radio frequencies that are suitable for narrowband communications. The range of consecutive radio frequencies may be defined by a government agency, a trade organization, a research group or institution, or by another entity or organization.

In some implementations, the LTE narrowband channel may structure as a number of contiguous subcarriers of equal widths. A middle subcarrier of the LTE narrowband channel may be subdivided into a DC subcarrier and two other subcarriers that may be directed to synchronization, paging, or another type of purpose. One or more of the remaining subcarriers may be used to transmit other types of information that enable M2M device 205 to operate as intended (e.g., by transmitting utility usage information, vehicle performance information, etc.). In some implementations, one or more of the remaining subcarriers may be allocated as subcarriers for a specific purpose (e.g., a particular type of subcarrier or a particular type of information).

Figure 4:
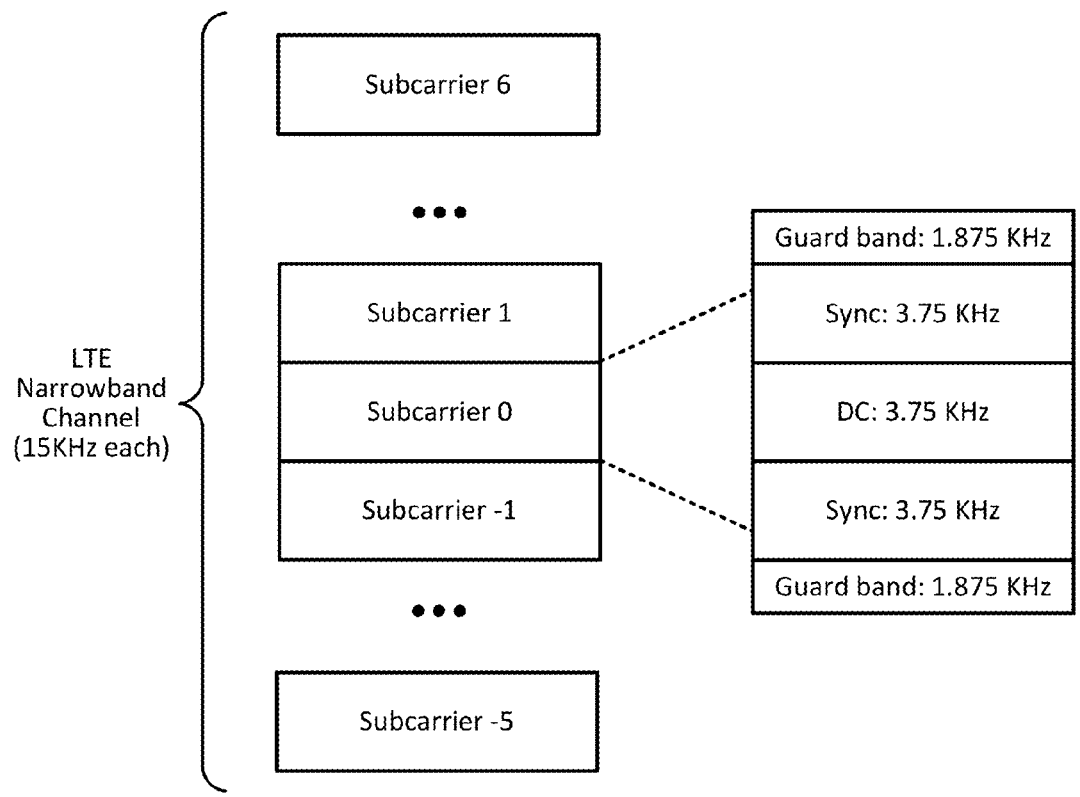
FIG. 4 is a block diagram of an example LTE narrowband channel.

FIG. 4 is a block diagram of an example LTE narrowband channel. As shown, the LTE narrowband channel may include 12 subcarriers of 15 KHz each, for a total of 180 KHz. Subcarriers −5 to −1 and 1 to 6 may be general-purpose carriers that may be used to communicate information between M2M 205 and eNB 220. By contrast, in accordance with some implementations, subcarrier 0 may be divided into additional subcarriers. For instance, the 15 KHz allocated to subcarrier 0 may be divided into two 3.75 KHz subcarriers dedicated to transmit synchronization information to M2M devices 205. The synchronization subcarriers may be positioned on either side of a 3.75 KHz DC subcarrier. As a DC subcarrier, the 3.75 KHz DC subcarrier may not be used for transmitting information. Instead, the DC subcarrier may remain unused in order to prevent DC offset leaks from interfering with the other subcarriers of the LTE narrowband channel. The LTE narrowband channel may also include 1.875 KHz guard bands on the upper and lower frequency portions of subcarrier 0 in order to, for example, prevent the synchronization subcarriers from interfering with the other subcarriers (subcarriers −5 to −1 or 1 to 6) of the LTE narrowband channel (or vice versa).

Figure 5:
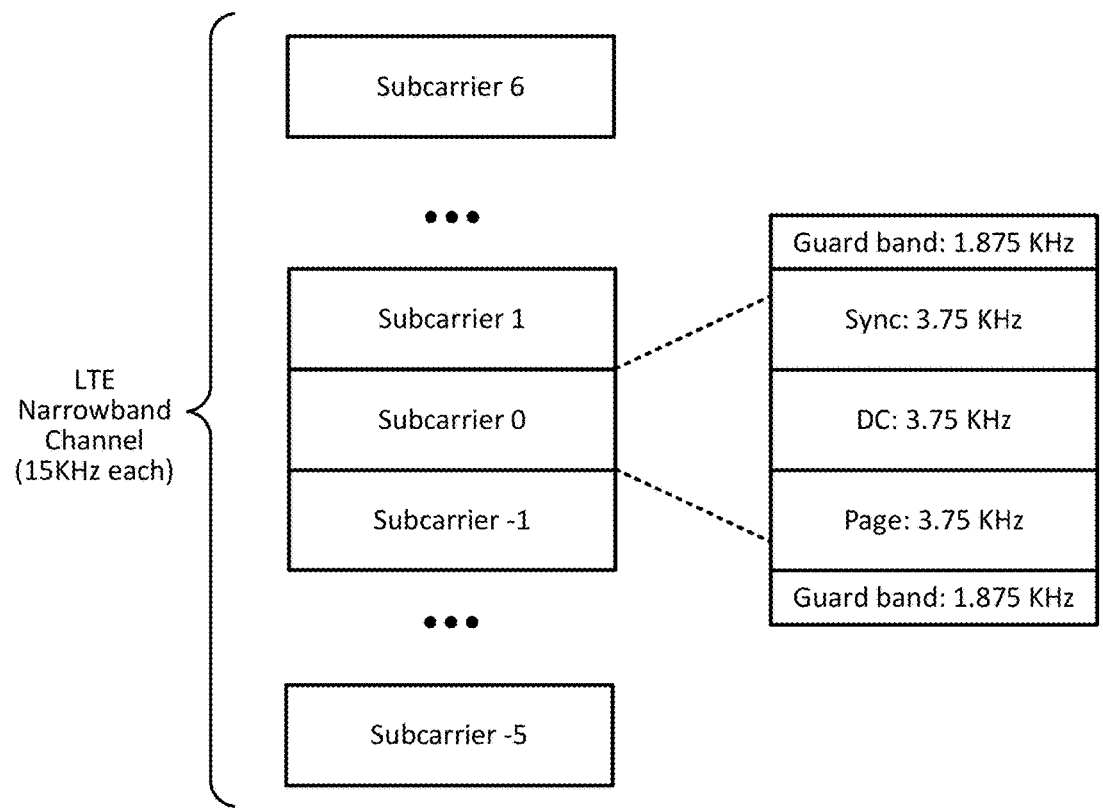
FIG. 5 is a block diagram of another example LTE narrowband channel.

FIG. 5 is a block diagram of another example LTE narrowband channel. Similar to the LTE narrowband channel of FIG. 4, the LTE narrowband channel of FIG. 5 may include 12 subcarriers of 15 KHz each, for a total of 180 KHz. Subcarriers −5 to −1 and 1 to 6 may be general-purpose carriers that may be used to communicate information between M2M 205 and eNB 220. By contrast, subcarrier 0 may be divided into additional subcarriers. For instance, the 15 KHz allocated to subcarrier 0 may be divided into one 3.75 KHz subcarrier dedicated to transmitting synchronization information and another 3.75 KHz subcarrier dedicated to transmitting paging information. As shown, the synchronization and paging subcarriers may be positioned on either side of a 3.75 KHz DC subcarrier. In some implementations, the paging subcarrier may include a new Forward Access Channel (FACH) corresponding to a communications standard, such as the 3GPP communications standard.

As a DC subcarrier, the 3.75 KHz DC subcarrier may not be used for transmitting information. Instead, the DC subcarrier may remain unused in order to prevent DC offset leaks from interfering with the other subcarriers of the LTE narrowband channel. The LTE narrowband channel may also include 1.875 KHz guard bands on the upper and lower frequency portions of subcarrier 0 in order to, for example, prevent the synchronization and paging subcarriers from interfering with the other subcarriers (subcarriers −5 to −1 or 1-6) of the LTE narrowband channel (or vice versa).

Returning to FIG. 3, process 300 may include providing synchronization information to M2M device using the LTE narrowband channel (block 320). For instance, eNB 220 may transmit synchronization information throughout a coverage area of eNB 220, and M2M devices 205 within the coverage area of eNB 220 may receive the information. The synchronization information may be transmitted by eNB 220 using one or more subcarriers of the LTE narrowband channel. For instance, if the LTE narrowband channel was defined as having two synchronization subcarriers (as shown in FIG. 4), then eNB 220 may transmit the synchronization information using one or both synchronization subcarriers. However, if the LTE narrowband channel was defined as having only one synchronization subcarrier (as shown in FIG. 5), then eNB 220 may transmit the synchronization information using only one synchronization subcarrier. Additionally, in some implementations, eNB 220 may transmit the synchronization in a manner that enables M2M devices 205 to become synchronized in a timely and power-efficient manner relative to currently available techniques for synchronizing M2M devices 205.

Figure 6:
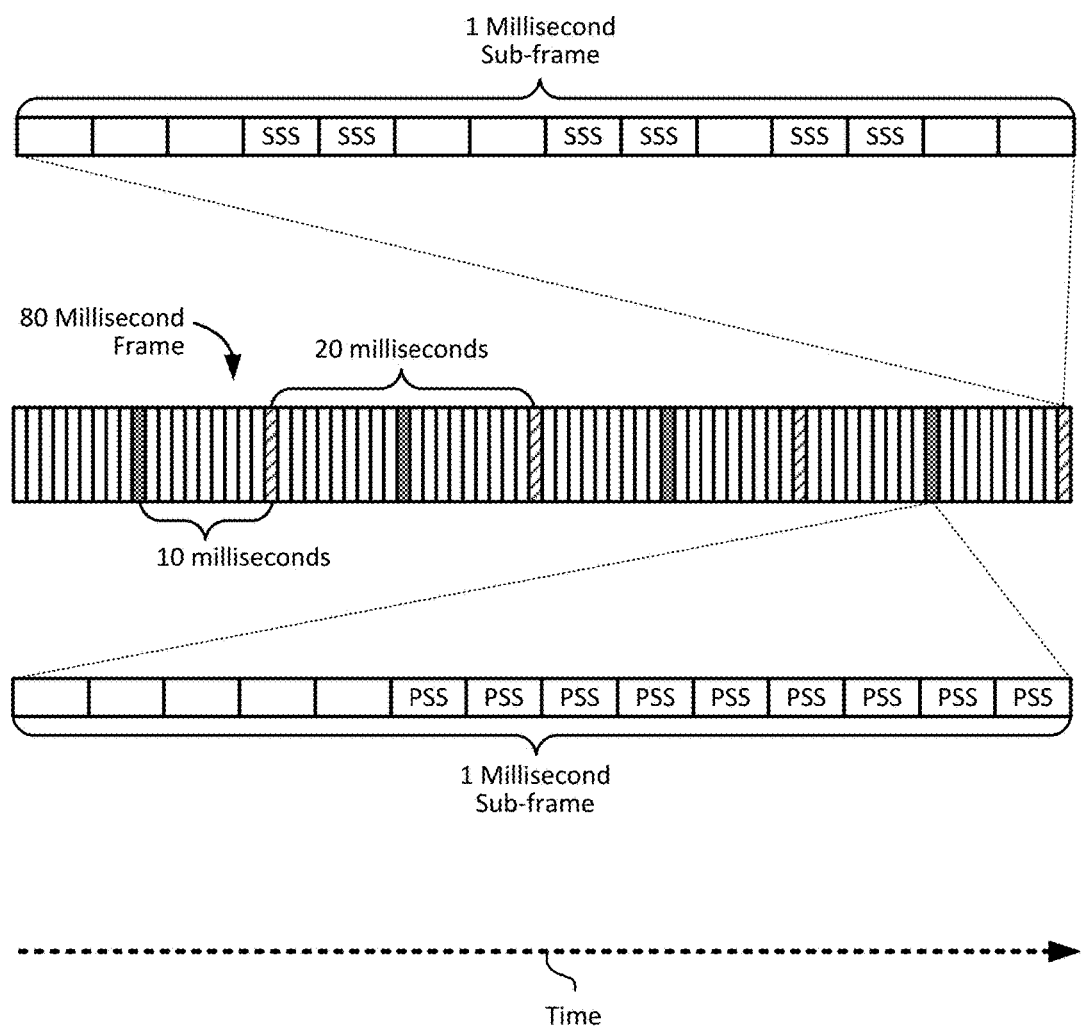
FIG. 6 is a timeline diagram of a known approach to communicating synchronization information to M2M devices in a typical LTE network.

FIG. 6 is a timeline diagram of a known approach to communicating synchronization information to M2M devices 205 in a typical LTE network. As shown, eNB 220 may use an 80 millisecond (ms) frame to communicate synchronization information. The 80 ms frame may include a maximum sequence length frame (or M frame), and the synchronization information may include a PSS and an SSS. eNB 220 may communicate the synchronization information using a channel other than the LTE narrowband channel, such that narrowband devices (e.g., M2M device 205) and high data rate devices (e.g., user device 210) must obtain the synchronization information in the same way.

As shown, the synchronization information (the PSS and the SSS) may be transmitted, in an alternating fashion, within a 1 ms sub-frame every 10 ms, such that the PSS and SSS are each transmitted in a 1 ms sub-frame every 20 ms. In the figure, 1 ms sub-frames that include a PSS are denoted by a shaded rectangle, while 1 ms sub-frames that include an SSS are denoted by a hatched rectangle. The actual PSS and SSS within the 1 ms sub-frame may be transmitted sporadically. As such, known approaches to communicating synchronization information may require M2M devices 205 to spend significant time and power listening to a particular channel in order to discover the synchronization information that is being transmitted by eNB 220, which may be exacerbated when M2M device 205 must first perform a search for a channel suitable for synchronization purposes and or perform offset detection and correction for tuning an internal oscillator to the appropriate channel.

Figure 7:
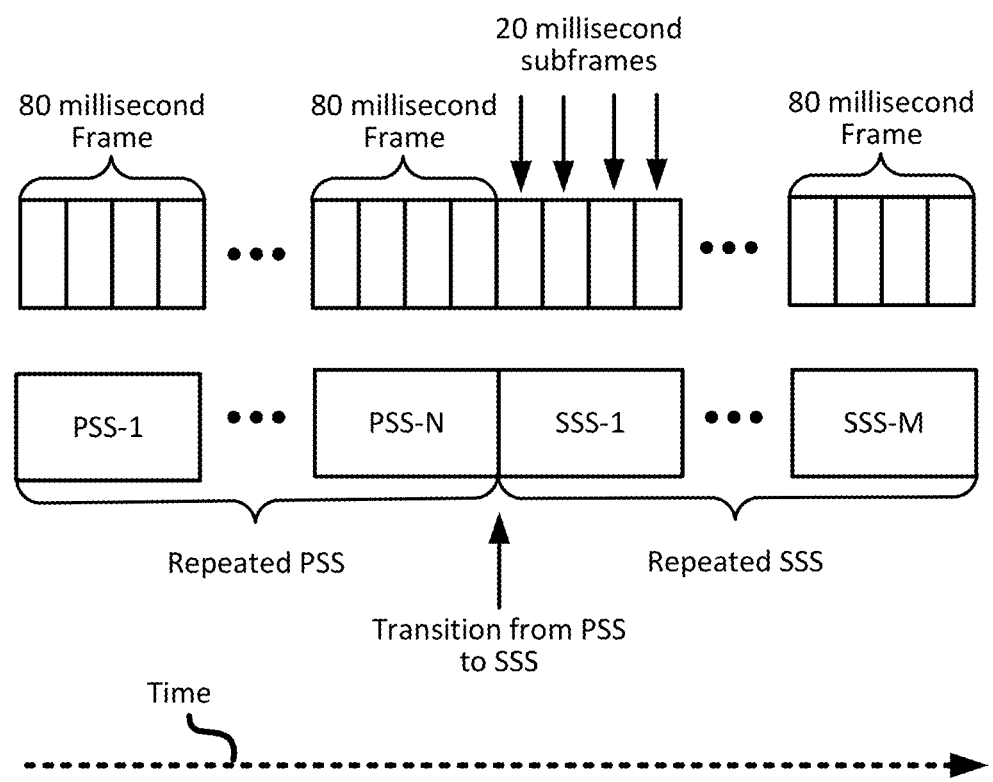
FIG. 7 is a timeline diagram of an example approach to communicating synchronization information to M2M devices using an LTE narrowband channel.

FIG. 7 is a timeline diagram of an example approach to communicating synchronization information using an LTE narrowband channel. As shown, similar to the approach discussed above in FIG. 6, eNB 220 may transmit synchronization information (e.g., PSS and SSS) using 80 ms frames. However, unlike the approach of FIG. 6, the eNB 220 may use the entire 80 ms frame to transmit the synchronization information (e.g., either the PSS or the SSS). For instance, several consecutive 80 ms frames may be dedicated to transmitting the PSS, followed by several consecutive 80 ms frames dedicated to transmitting the SSS.

As such, eNB 220 may enable M2M device 205 to save time and power when obtaining synchronization information by using a subcarrier (e.g., a synchronization subcarrier) dedicated solely to transmitting synchronization information, in addition to arranging the synchronization information in such a manner that it may be easily received by M2M device 205. In some implementations, the duration of the PSS interval and/or the SSS interval may be fixed or predefined, and therefore, may be known to M2M device 205, which may further facilitate the transfer of synchronization information to M2M device 205. In some implementations, the PSS and/or the SSS may include a Zadoff-Chu (ZC) sequence (e.g., having a length of 293 ZC in a maximum length sequence (MLS) or (M) sequence).

Figure 8:
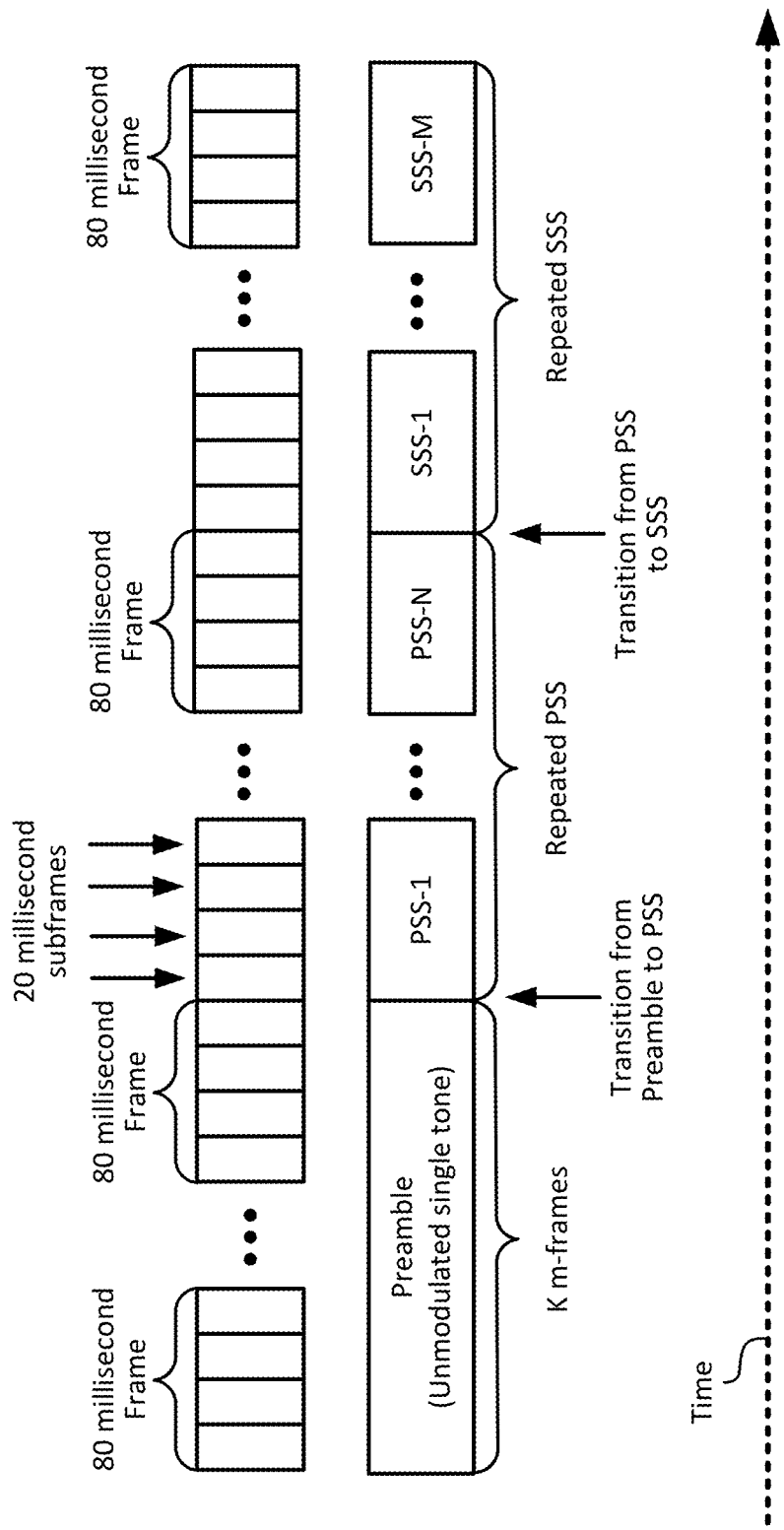
FIG. 8 is a timeline diagram of another example approach to communicating synchronization information to M2M devices using an LTE narrowband channel.

FIG. 8 is a timeline diagram of another example approach to communicating synchronization information using an LTE narrowband channel. As shown, similar to the approach discussed above in FIG. 6, eNB 220 may transmit synchronization information (e.g., PSS and SSS) using 80 ms frames. However, unlike the approach of FIG. 6, the eNB 220 may use entire 80 ms frames to consecutively repeat the synchronization information (e.g., either the PSS or the SSS). For instance, several consecutive 80 ms frames may be dedicated to transmitting the PSS, followed by an immediate transition into several consecutive 80 ms frames dedicated to transmitting the SSS.

In addition, the synchronization information may be preceded by a preamble signal that may occur over one or more 80 ms frames. The preamble may include an unmodulated, single tone transmitted over a preselected number of frames. The preamble may enable M2M device 205 to train (or tune) an interior oscillator to be ready to recognized the synchronization information more rapidly and/or reduce the need for offset detection and correction. As such, eNB 220 may enable M2M device 205 to save time and power when obtaining synchronization information by using a subcarrier (e.g., a synchronization subcarrier) dedicated solely to transmitting synchronization information, arranging the synchronization information in a simple and straight-forward manner, and by implementing a preamble that may help M2M device 205 quickly tune an internal oscillator device to the LTE narrowband channel. In some implementations, the duration of the preamble, the PSS interval, and/or the SSS interval may be fixed or predefined, and therefore, may be known to M2M device 205, which may further facilitate the transfer of synchronization information to M2M device 205.

Returning to FIG. 3, process 300 may include registering M2M device 205 with a wireless telecommunications network (block 330). For instance, eNB 220 may relay information between M2M device 205 and a core network (e.g., EPC) in order to help M2M device 205 become registered and/or authenticated for communicating via a wireless telecommunications network. In some implementations, M2M device 205 may be registered or authenticated by the wireless telecommunications network in order to gain access to a centralized server to which M2M device 205 may send information collected by M2M device 205. In some implementations, M2M device 205 may also be required to register with the wireless telecommunications network before receiving a page code as described herein.

Process 300 may include assigning a paging code to M2M device 205 (bock 340). For instance, eNB 220 may logically associated a unique identifier to M2M device 205 for paging purposes. eNB 220 may communicate a copy of the unique identifier to M2M device 205. eNB 220 may also create a record of unique identifier and the associating between the unique identifier and M2M device 205. eNB 220 may store the record locally or at a remote location, such as a centralized server or other repository for storing such information. In some implementations, the paging code may be assigned or communicated to M2M device 205 using a ZC sequence or an M-sequence.

Figure 9:
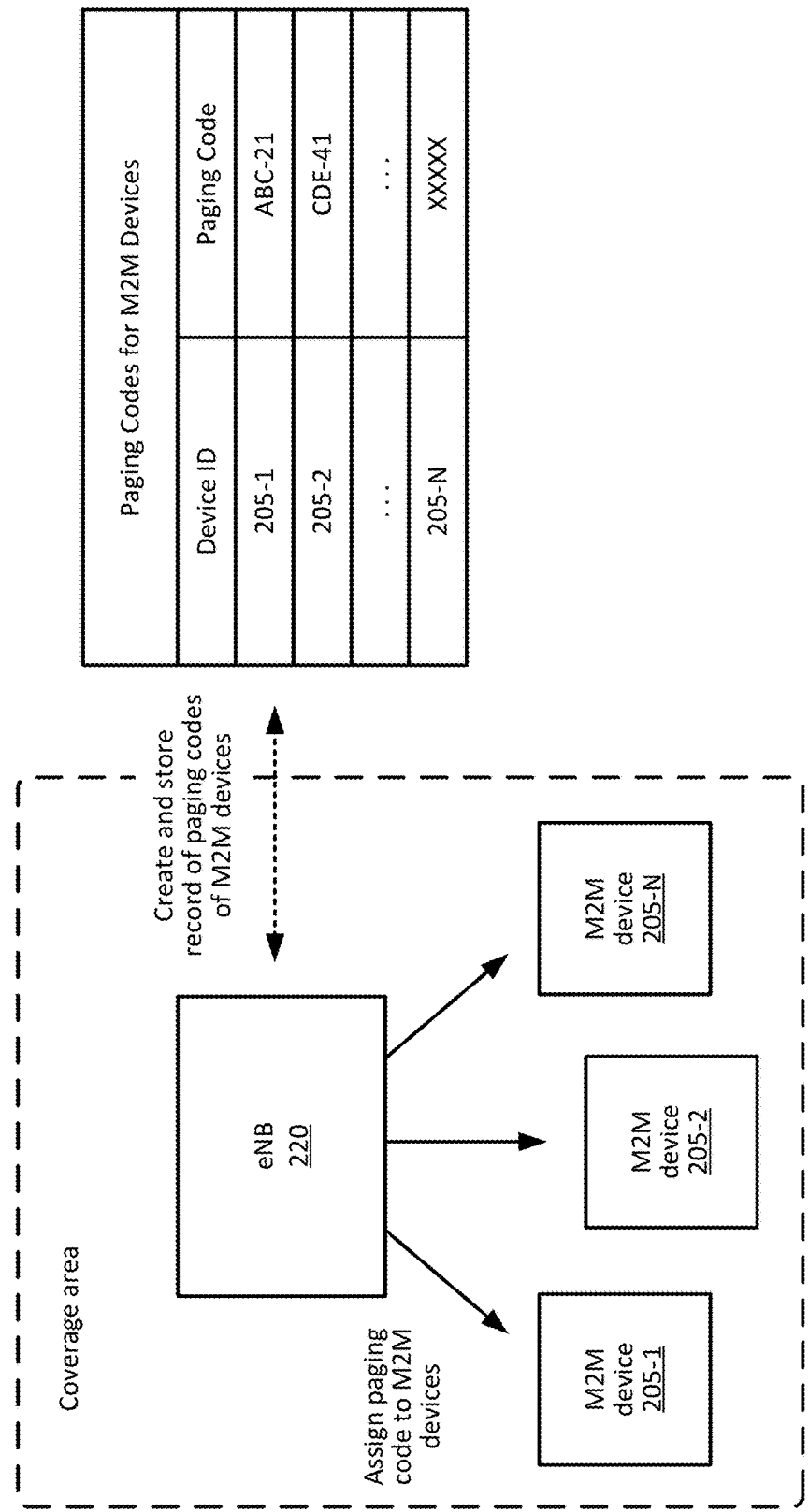
FIG. 9 is a block diagram of an example for assigning paging codes to M2M devices.

FIG. 9 is a block diagram of an example for assigning paging codes to M2M devices 205. As shown, eNB 220 may assign paging codes to M2M devices 205-1, 205-2, . . . , 205-N within a coverage area of eNB 220. In some implementations, M2M devices 205 may have already been synchronized and/or registered (and/or authenticated) with a core network (e.g., an EPC) of eNB 220 and eNB 220 may assign the paging code in response to M2M devices 205 being registered and/or authenticated. eNB 220 may create a logical association between the assigned paging codes and M2M device 205 via a digital record that may be stored by eNB 220 (or by another device). In some implementations, eNB 220 may extend the logical association to include the LTE narrowband channel.

The record may indicate a relationship between a particular M2M device 205 and the paging code assigned to the particular M2M device 205. For instance, the record may include a device identifier of M2M device 205 (which may include mobile device number (MDN) or another type of identifier of M2M device 205) and the assigned paging code. If or when an M2M device 205 is handed over to anther eNB 220, the paging code may be communicated to the new eNB 220 (by the previous eNB 220 or by M2M device 205) so that the new eNB 220 may page M2M device 205 using the paging code. In some implementations, the new eNB 220 may, instead, assign a new paging code to M2M device 205 in response to the M2M device 205 being handed-over.

Returning again to FIG. 3, as indicated by block 350, process 300 may include a period of time transpiring between assigning the paging code to M2M device 205 (block 340) and detecting a trigger for paging the M2M device 205 (block 360). In some implementations, this may include M2M device 205 entering into an idle mode or another type of mode of operation designed to conserve power. In some implementations, M2M device 205 may enter an idle mode in response to being idle (e.g., not performing certain or significant internal processes, not receiving information, not sending information, etc.) for a preselected period of time. In some implementations, M2M device 205 may enter into an idle mode for another reason, such as in accordance with a schedule indicating that M2M device 205 is to become idle at a certain date and/or time. In some implementations, whether in an idle mode or not, M2M device 205 may passively listen for the assigned paging code on the LTE narrowband channel and/or the paging subcarrier of the LTE narrowband channel.

Process 300 may also include detecting a trigger for paging the M2M device 205 (block 360). For instance, eNB 220 may detect an event that prompts eNB 220 to proactively contact M2M device 205. In some implementations, the event may be a prompt to contact M2M device 205 in accordance with a scheduled. For instance, eNB 220 may page M2M device 205 in accordance with a schedule that is stored by eNB 220 or by another device (e.g., of the EPC). In some implementations, eNB 220 may be prompted to page M2M device 205 based on an unscheduled event, which may correspond to an emergency, a request from another device (e.g., of the EPC) or a server device to which M2M device 205 periodically uploads information), or any other reason for which a particular M2M device 205 or a particular user device 210 might be paged.

Process 300 may include communicating the paging code to M2M device 220 using the paging subcarrier of the LTE narrowband channel (block 370). For example, eNB 220 may determine that the device to be paged is M2M device 220 and/or that the device to be paged should be paged using the LTE narrowband channel. Additionally, eNB 220 may identify the paging subcarrier of the LTE narrowband channel and/or communicate the paging code via the LTE narrowband channel. As such, in contrast to current LTE paging techniques, M2M device 205 may not be required to periodically awaken and then synchronize and communicate with eNB 220 just in case eNB 220 is trying to page M2M device 205. Instead, M2M device 205 may passively listen for a paging code from the paging subcarrier of the LTE narrowband channel, which may reduce power consumption and extend batter life of M2M device 205.

Process 300 may include providing synchronization information to M2M device 205 using the LTE narrowband channel (block 380). For instance, as described above with reference to block 320, eNB 205 may continue transmitting synchronization information using the synchronization subcarrier of the LTE narrowband channel. In some implementations, doing so may enable M2M device 205 become resynchronized with eNB 220 in response to M2M device 205 receiving the paging code previously associated with M2M device 205. In some implementations, M2M device 205 may have remained synchronized with eNB 220 after an initial synchronization regardless of whether M2M device 205 has entered an idle mode. In such scenarios, eNB 220 may still be providing synchronization information, but M2M device 205 may not need to be resynchronized as suggested by block 380.

Process 300 may include receiving a paging response from M2M device 205 and communicating with M2M device 205 regarding the page (block 390). For example, in response to providing the M2M device 205 with the paging code associated with M2M device 205, eNB 220 may receiving a message from M2M device 205 indicating that M2M device 205 is ready to communicate with eNB 220 regarding the page. In some implementations, the message may be received by eNB 220 via the paging subcarrier of the LTE narrowband channel. In some implementations, the message may also, or alternatively, be received by another subcarrier of the LTE narrowband channel (e.g., any of subcarriers −5 to −1 and/or 1-6). In response to such a message, eNB 220 may communicate with M2M device 205 about the page, which may include informing M2M device 205 about the reason for the page, requesting the M2M device 205 perform one or more operations, requesting that M2M device 205 provide eNB 220 with certain information, providing M2M device 205 with information, etc. In some implementations, the paging response may include an inquiry message regarding the purpose behind paging M2M device 205. In some implementations, the paging response may include M2M device 205 notifying eNB 220 that M2M device 205 is awake and ready to respond to the reason for which M2M device 205 was paged.

Figure 10:
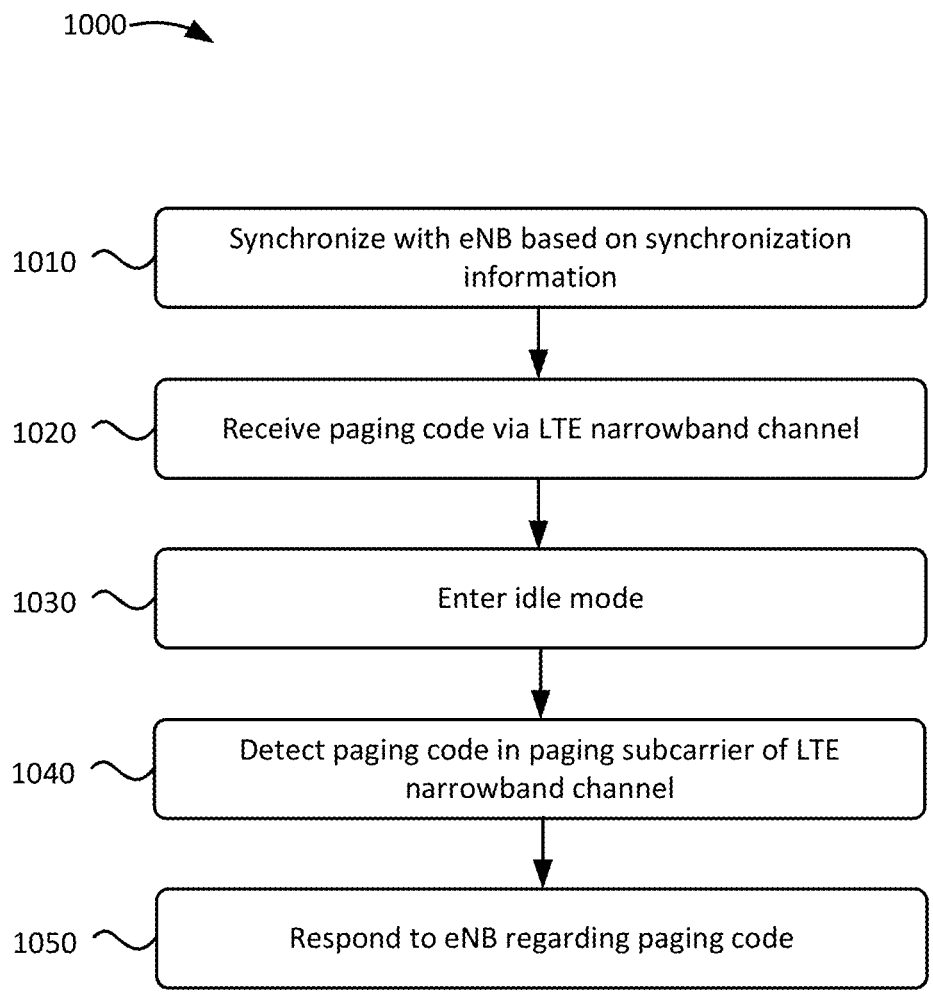
FIG. 10 is a flowchart diagram of an example process for receiving synchronization and paging information from an enhanced Node B (eNB) via an LTE narrowband channel.

The techniques described herein may include one or more operations being performed by M2M device 205 (and/or user device 210). Such operations may correspond to the operations discussed above with reference to eNB 220 and/or process 300 of FIG. 3. For instance, process 300 may include eNB 220 providing synchronization information to M2M device 205 using an LTE narrowband channel, and as such, the techniques described herein also include M2M device 205 (and/or user device 210) receiving synchronization from eNB 205 via the LTE narrowband channel. In other words, the scope of the techniques described herein may not only include operations that are descried explicitly but also any corresponding implicit operations. FIG. 10 includes a brief example of a process involving such operations.

FIG. 10 is a flowchart diagram of an example process 1000 for receiving synchronization and paging information from eNB 220 via an LTE narrowband channel. In some implementations, process 1000 may be performed by M2M device 205. In some implementations, process 1000 may be performed by user device 210.

As shown, process 1000 may also include synchronizing with an eNB 220 based on the synchronization information received via an LTE narrowband channel (block 1010). For instance, M2M device 205 may receive synchronization information from eNB 220 via a synchronization subcarrier of the LTE narrowband channel. The synchronization subcarrier may include PSS and SSS information corresponding to eNB 220. Additionally, the synchronization subcarrier may include a preamble that precedes the PSS and SSS information. In some implementations, M2M device 205 may use the preamble to set and internal oscillation device in order to recognize and interpret the synchronization information more quickly. In some implementations, M2M device 205 may become synchronized by setting an internal clock, of M2M device 205, based on the synchronization information.

Process 1000 may also include receiving a paging code from eNB 220 via the LTE narrowband channel (block 1020). For example, M2M device 205 may register (and/or authenticate) with a wireless telecommunications network corresponding to eNB 220. In response to registering, M2M device 205 may receive a paging code that is assigned to M2M device 205 by eNB 220. M2M device 205 may use the paging code to listen for a page from eNB 220 via a paging subcarrier of the LTE narrowband channel.

As indicated by block 1030, process 300 may include a period of time transpiring between receiving the paging code (block 1020) and detecting the paging code in a paging subcarrier of the LTE narrowband channel (block 1040). In some implementations, this may include M2M device 205 entering into an idle mode or another type of mode of operation designed to conserve power. In some implementations, M2M device 205 may enter an idle mode in response to being idle (e.g., not performing certain or significant internal processes, not receiving information, not sending information, etc.) for a preselected period of time. In some implementations, M2M device 205 may enter into an idle mode for another reason, such as in accordance with a schedule indicating that M2M device 205 is to become idle at a certain date and/or time. In some implementations, whether in an idle mode or not, M2M device 205 may passively listen for the assigned paging code on the paging subcarrier of the LTE narrowband channel.

Process 1000 may also include detecting the paging code in the paging code subcarrier of the LTE narrowband channel (block 1030). For instance, M2M device 205 may passively listen for the paging code on the paging subcarrier of the LTE narrowband channel. For instance, M2M device 205 may remain in an idle mode (or an analogous mode of operation) while still listening for the paging code on the paging subcarrier. At some point, M2M device 205 may detect the paging code being transmitted by eNB 220 via the paging subcarrier.

Process 1000 may also include responding to eNB 220 regarding the paging code (block 1050). For example, in response to detecting the paging code, M2M device 205 may include perform one or more operations in order to respond to eNB 220. In some implementations, M2M device 205 may re-synchronize with eNB 220 in a manner similar to that discussed above with reference to block 1010. In some implementations, M2M device 205 may have remained synchronized with eNB 220 and may not need to re-synchronize. Additionally, or alternatively, M2M device 205 may notify eNB 220 that M2M device 205 is awake and ready to proceed with reference to being paged. In some implementations, the paging code may have been received with one or more instructions (or an indication regarding the purpose for the page) and M2M device 205 may respond in accordance with the instruction, which may include performing one or more operations, providing eNB 220 with one or more types of information, etc.

Figure 11:
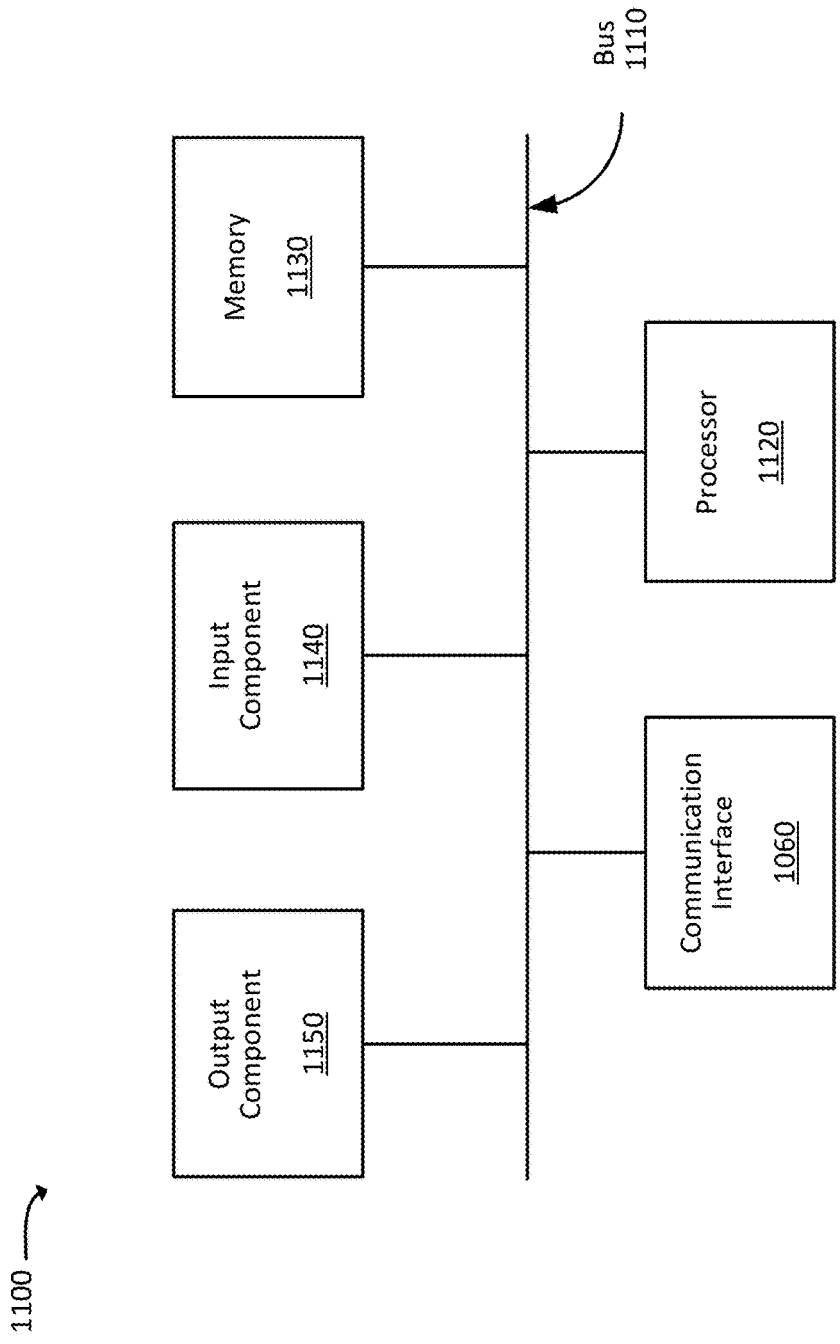
FIG. 11 is a diagram of example components of a device.

FIG. 11 is a diagram of example components of a device 1100. Each of the devices illustrated in FIGS. 2 and 9 may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 3-10 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    identifying, by a base station of a wireless telecommunications network, a particular direct circuit (DC) subcarrier within a narrowband channel that includes a plurality of subcarriers;
    partitioning, by the base station, the particular DC subcarrier into a plurality of additional subcarriers that include:
        a first DC subcarrier occupying a middle bandwidth of the particular DC subcarrier,
        a synchronization subcarrier dedicated solely to communicating synchronization information from the base station to devices within a coverage area of the base station, the synchronization subcarrier being arranged to abut one side of the first DC subcarrier, and
        a paging subcarrier dedicated solely to communicating paging information to the devices within the coverage area of the base station, paging subcarrier being arranged to abut an opposite side of the first DC subcarrier;
    using, by the base station, the paging subcarrier to page the devices within the coverage area of the base station via the paging subcarrier; and
    using, by the base station, the synchronization subcarrier to communicate synchronization information to the devices via the synchronization subcarrier.

2. The method of claim 1, wherein the synchronization subcarrier occupies a first bandwidth located on one side of the particular DC subcarrier and the paging subcarrier occupies a second bandwidth on an opposite side of the particular DC subcarrier.

3. The method of claim 2, wherein the first bandwidth, the second bandwidth, and the middle bandwidth include bandwidths of equal frequency ranges.

4. The method of claim 1, wherein partitioning the particular DC subcarrier also includes:
    creating a first guard band positioned between the synchronization subcarrier and a first subcarrier that abuts the particular DC subcarrier of the narrowband channel, and
    creating a second guard band positioned between the paging subcarrier and a second subcarrier that abuts the particular DC subcarrier of the narrowband channel.

5. The method of claim 1, further comprising:
    assigning a unique paging code to a particular device within the coverage area of the base station;
    providing the unique paging code to the particular device;
    detecting a trigger for paging the particular device; and
    communicating, in response to the trigger, the paging code to the particular device via the paging subcarrier.

6. The method of claim 1, wherein the communicating the synchronization information includes:
    consecutively repeating a Primary Synchronization Signal (PSS) for a first preselected number of frames, and
    transitioning, after repeating the PSS for the first preselected number of frames, to consecutively repeating a Secondary Synchronization Signal (SSS) for a second preselected number of frames.

7. The method of claim 6, wherein communicating the synchronization information further includes:
    prior to consecutively repeating the PSS, communicating, via the synchronization subcarrier, a preamble for a third preselected number of frames to assist the devices, within the coverage area of the base station, with tuning interior oscillators of the devices to promptly recognize the PSS and SSS.

8. A base station, comprising:
    a non-transitory memory device storing a plurality of processor-executable instructions; and
    a processor configured to execute the processor-executable instructions, wherein executing the processor-executable instructions cause the processor to:
        identify a particular direct circuit (DC) subcarrier within a narrowband channel that includes a plurality of subcarriers;
        partition the particular DC subcarrier into a plurality of additional subcarriers that include:
            a first DC subcarrier occupying a middle bandwidth of the particular DC subcarrier,
            a synchronization subcarrier, abutting the first DC subcarrier on one side, dedicated solely to communicating synchronization information from the base station to devices within a coverage area of the base station, and
            a paging subcarrier, abutting the first DC subcarrier on an opposite side, dedicated solely to communicating paging information to the devices within the coverage area of the base station;
        use the paging subcarrier to page the devices within the coverage area of the base station via the paging subcarrier; and
        use the synchronization subcarrier to communicate synchronization information to the devices via the synchronization subcarrier.

9. The base station of claim 8, wherein the synchronization subcarrier occupies a first bandwidth located on one side of the particular DC subcarrier and the paging subcarrier occupies a second bandwidth on an opposite side of the particular DC subcarrier.

10. The base station of claim 9, wherein the first bandwidth, the second bandwidth, and the middle bandwidth include bandwidths of equal frequency ranges.

11. The base station of claim 9, wherein, executing the processor-executable instructions, to partition the middle subcarrier, further causes the processor to:
    create a first guard band positioned between the synchronization subcarrier and a first subcarrier that abuts the particular DC subcarrier of the narrowband channel, and create a second guard band positioned between the paging subcarrier and a second subcarrier that abuts the particular DC subcarrier of the narrowband channel.

12. The base station of claim 8, wherein the processor-executable instructions cause the processor to:
assign a unique paging code to a particular device within the coverage area of the base station;
provide the unique paging code to the particular device;
detect a trigger for paging the particular device; and
communicate, in response to the trigger, the paging code to the particular device via the paging subcarrier.

13. The base station of claim 8, wherein executing the processor-executable instructions, to communicate the synchronization information, further causes the processor to:
consecutively repeat a Primary Synchronization Signal (PSS) for a first preselected number of frames, and
after repeating the PSS for the first preselected number of frames, consecutively repeat a Secondary Synchronization Signal (SSS) for a second preselected number of frames.

14. A device, comprising:
a non-transitory memory device storing a plurality of processor-executable instructions; and
a processor configured to execute the processor-executable instructions, wherein executing the processor-executable instructions cause the processor to:
receive, via a Long-Term Evolution (LTE) narrowband channel, synchronization information from an enhanced Node B (eNB) of a wireless telecommunications network, the LTE narrowband channel including a first direct circuit (DC) subcarrier partitioned into additional subcarriers that include:
a second DC subcarrier occupying a middle bandwidth of the first DC subcarrier,
a synchronization subcarrier dedicated solely to communicate the synchronization information devices within the coverage area of the eNB and arranged to abut one side of the second DC subcarrier, and
a paging subcarrier dedicated solely to communicate paging information to the devices within the coverage area of the eNB and arranged to abut an opposite side of the second DC subcarrier;
synchronize with the eNB based on the synchronization information received via the synchronization channel of the LTE narrowband channel; and
receive a paging code, from the eNB, via the paging subcarrier, to cause the user device to begin communicating with the eNB proactively.

15. The device of claim 14, wherein, to receive the synchronization information via the synchronization subcarrier of the LTE narrowband channel, the processor-executable instructions cause the processor to:
receive a preamble signal for a first preselected number of consecutive frames,
tune an internal oscillator of the device based on the preamble signal,
transition, in response to the first preselected number of frames concluding, to receive a Primary Synchronization Signal (PSS) for a second preselected number of consecutive frames, and
transition, in response to the second preselected number of frames concluding, to receive a Secondary Synchronization Signal (SSS) for a third preselected number of consecutive frames.

16. The device of claim 14, wherein the processor-executable instructions cause the processor to:
passively listen for paging codes, from the eNB, via the paging subcarrier,
receive the paging code from the eNB,
exit the idle mode in response to the paging code, and
contact, after exiting the idle mode, the eNB to determine the purpose for which the device was paged.

17. The device of claim 14, wherein the second DC subcarrier, the synchronization subcarrier, and the paging subcarrier correspond to bandwidths of equal frequency ranges.

18. The device of claim 14, wherein the first DC subcarrier further includes a guard band positioned between the synchronization subcarrier and another subcarrier that abuts the first DC subcarrier in the LTE narrowband channel.

19. The device of claim 14, wherein the first DC subcarrier further includes a guard band positioned between the paging subcarrier and another subcarrier that abuts the first DC subcarrier in the LTE narrowband channel.

20. The device of claim 19, wherein the guard band is a first guard band and another subcarrier is a third subcarrier, wherein the first DC subcarrier further includes a second guard band positioned between the synchronization subcarrier and a fourth subcarrier that abuts the first DC subcarrier in the LTE narrowband channel.

* * * * *